(12) United States Patent
Yang

(10) Patent No.: US 8,160,083 B2
(45) Date of Patent: Apr. 17, 2012

(54) METHOD AND APPARATUS FOR IMPLEMENTING BEARER PATH

(75) Inventor: Weiwei Yang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 248 days.

(21) Appl. No.: 12/643,306

(22) Filed: Dec. 21, 2009

(65) Prior Publication Data

US 2010/0098096 A1 Apr. 22, 2010

Related U.S. Application Data

(63) Continuation of application No. PCT/CN2008/071396, filed on Jun. 20, 2008.

(30) Foreign Application Priority Data

Jun. 21, 2007 (CN) .......................... 2007 1 0112411

(51) Int. Cl.
*H04L 12/28* (2006.01)
*H04L 12/56* (2006.01)
*H04J 3/12* (2006.01)

(52) U.S. Cl. ........ 370/401; 370/392; 370/410; 370/426; 370/522

(58) Field of Classification Search .................. 370/389, 370/392, 400, 401, 410, 426, 522
See application file for complete search history.

(56) References Cited

U.S. PATENT DOCUMENTS

| | | | |
|---|---|---|---|
| 6,944,166 B1 * | 9/2005 | Perinpanathan et al. | ..... 370/401 |
| 2007/0008958 A1 * | 1/2007 | Clemm et al. | ................ 370/352 |

OTHER PUBLICATIONS

Written Opinion of The International Searching Authority issued in corresponding PCT Application No. PCT/CN2008/071396; mailed Sep. 16, 2008.
Office Action issued in corresponding Chinese Patent Application No. 200710112411.X; issued Apr. 27, 2010.
Braden, R. et al. "Resource Reservation Protocol (RSVP)—Version 1 Functional Specification" The Internet Society. Sep. 1997.
Andreasen, F. et al. Media Gateway Control Protocol (MGCP)—Version 1.0. The Internet Society. Jan. 2003.
Groves, C. "Gateway Control Protocol Version 1" The Internet Society. Jun. 2003.
"Series H: Audiovisual and Multimedia Systems Infrastructure of Audiovisual Services—Communication Procedures" International Telecommunication Union. Mar. 2004.
"Series H: Audiovisual and Multimedia Systems Infrastructure of Audiovisual Services—Communication Procedures" International Telecommunication Union. Sep. 2005.
Office Action issued in corresponding Chinese Patent Application No. 200710112411.X, mailed Feb. 16, 2011.

\* cited by examiner

*Primary Examiner* — Ronald Abelson
(74) *Attorney, Agent, or Firm* — Brinks Hofer Gilson & Lione

(57) ABSTRACT

A method and apparatus for implementing a bearer path are disclosed. The method includes the following steps: a Media Gateway (MG) reports a preset Path Request (PR) event to a Media Gateway Controller (MGC) according to a received request message related to a bearer path, requesting the MGC to deliver a resource reservation decision; the MG receives the resource reservation decision sent by the MGC; and the MG processes the bearer path according to the resource reservation decision. The present disclosure is applicable to setup of a bearer path.

18 Claims, 10 Drawing Sheets

METHOD AND APPARATUS FOR IMPLEMENTING BEARER PATH

CROSS-REFERENCE TO RELATED APPLICATIONS

This application is a continuation of International Application No. PCT/CN2008/071396, filed on Jun. 20, 2008, which claims priority to Chinese Patent Application No. 200710112411.X, filed on Jun. 21, 2007, both of which are hereby incorporated by reference in their entireties.

FIELD OF THE INVENTION

The present disclosure relates to the communication field, and in particular, to a method for implementing a bearer path, a Media Gateway (MG) and a Media Gateway Controller (MGC).

BACKGROUND OF THE INVENTION

The MGC and the MG are two key components in a packet-switched network. The MGC is responsible for call control and the MG is responsible for service bearing, thus separating the call control plane from the service bearer plane, sharing network resources sufficiently, simplifying the equipment upgrade and service extension, and reducing the costs of development and maintenance drastically. The networking of an MGC and two MGs in a Next Generation Network (NGN) is as shown in FIG. 1.

The gateway control protocol (or media gateway control protocol) is a primary protocol for communications between the MG and the MGC. The currently prevalent gateway control protocols include the H.248/MeGaCo and the MGCP. The Media Gateway Control Protocol (MGCP) version 1 was developed by the Internet Engineering Task Force (IETF) in October 1999 and revised in January 2003. The H.248/MeGaCo version 1 was developed by the IETF and the International Telecommunications Union (ITU) in November 2000 and revised in June 2003. The H.248 version 2 was developed by the ITU in May 2002 and revised in March 2004. The H.248 version 3 was developed by the ITU in September 2005.

Taking the H.248 protocol as an example, various resources on the MG are expressed as terminations abstractly. Terminations are categorized into physical terminations and ephemeral terminations. Physical terminations are physical entities characterized by semi-permanent existence, for example, Time Division Multiplex (TDM) channels. Ephemeral terminations are public resources requested for being used temporarily and released after use, for example, Real-time Transport Protocol (RTP) streams. A root termination represents the entirety of the MG. The associations between terminations are abstractly represented by contexts. A context may include multiple terminations. Thus, a topology is used to describe the relationship between the terminations. Terminations that are not associated with other terminations are included in a null context.

Based on the abstract model of the protocol, call continuity is actually an operation on the termination and the context. Such operations are performed through command requests and replies between the MGC and the MG. Command types include: Add, Modify, Subtract, Move, AuditValue, AuditCapabilities, Notify, and ServiceChange. Command parameters, also known as descriptors, are categorized into property, signal, event, and statistic. Parameters with service relevancy are aggregated into a package logically.

As specified in H.248, an event refers to an occasion that needs to be monitored by the MG, for example, off-hook, on-hook, dialing, hooking, or network fault, quality alarm, and timer expiry. The occurrence of an event triggers the MG to notify the MGC and/or take certain actions. Generally, an event is delivered by the MGC to the MG, or preset on the MG, and is identified by "PackageID/EventID" which carries a RequestID and other necessary parameters. The delivered event is also called a requested event. Afterward, once the MG detects occurrence of the event, the MG reports the event to the MGC. The event is also identified by "PackageID/EventID" which carries the RequestID and other necessary parameters. The reported event is also called an observed event. The requested event and the observed event are correlated with the same request ID. The parameters carried in the requested event are independent of the parameters carried in the observed event. The event subsequently delivered for a certain termination replaces the previously delivered event.

When the MGC instructs the MG to add the termination to a context to create a media stream, the MGC generally describes the features of the termination through media descriptors. Media descriptors include: TerminationState descriptors, and Stream descriptors. The TerminationState descriptors describe the stream-unrelated features of the termination, including the parameters such as ServiceState and EventBufferControl. The Stream descriptors describe the stream-related features of the termination, including: LocalControl descriptors, Local descriptors, and Remote descriptors. The LocalControl descriptors include the parameters such as Mode, ReserveGroup, and ReserveValue. The Local descriptors describe the parameters for the local end to receive a media stream (namely, sent by the remote end). The Remote descriptors describe the parameters for the remote end to receive a media stream (namely, sent by the local end), for example, IP address or port number, codec algorithm, and packet time, which are organized through a Session Description Protocol (SDP).

Through the Local descriptors and the Remote descriptors, the MGC reserves and grants resources to the MG for coding and decoding the data streams and the media of the termination. Through such descriptors, the MG returns a response that carries the actually reserved resources. After receiving a Local descriptor or Remote descriptor, the MG performs operations which depend on the property values of the two reservation property parameters ReserveValue and ReserveGroup in the LocalControl descriptors. If the reservation property values are "False", only one resource may be reserved; if the reservation property values are "True", all resources may be reserved.

Currently, two models for providing Quality of Service (QoS) exist on the Internet: integrated service (IntServ) model, and differentiated service (DiffServ) model. The IntServ model is designed to provide end-to-end QoS. The endpoint requests a certain QoS level for its data streams. If the network accepts the request, the router processes the data streams according to this QoS level. The DiffServ model uses a Resource ReserVation Protocol (RSVP) to provide two types of services: guaranteed service, and controlled-load service. The guaranteed service meets the QoS requirements of applications by providing guaranteed bandwidths and delay restrictions, for example, reserving a 10M bandwidth and an end-to-end transmission delay not greater than 1 s for the traffic of the VoIP application. The controlled-load service ensures provision of a normal QoS level for the packets in the case of network overload in a way similar to best-effort, namely, meets the low-delay and low-packet-loss-ratio requirements of certain service packets in the case of network congestion.

RSVP is a network control protocol that provides a path resource reservation mechanism. The bearer path set up in the IP network through RSVP provides guaranteed bandwidths and router resources for the corresponding data streams.

The operating principles of RSVP are as follows: The sender sends a resource request message to the destination address through RSVP, and each router that supports RSVP sets up a path state table along the downlink route; to obtain resource reservation, the receiver sends an uplink RESV message, indicating the required QoS service type and notifying the resources (such as the transport protocol and port number) reserved for the packet; when each router that supports RSVP receives the RESV message along the uplink path, the router uses an admission control process to authenticate the request and configures the required resources. If rejecting the request, the router returns an error message to the receiver; if accepting the request, the router sends an uplink RESV message to the next router; when the last router receives the RESV message and accepts the request, the last router sends an acknowledgment message to the receiver. The foregoing process actually sets up a bearer path from the sender to the receiver, and the routers on the path reserve resources for the data likely to arrive.

Currently, H.248 implements single-point reservation of resources, namely, reserves resources for a stream on the termination only on the MG. When the MG receives a resource request message on the bearer path, for example, an RSVP Path message sent by the data sender, because H.248 does not support the mechanism of setting up a bearer path (such as an RSVP path) in the case that the MG and the MGC serve as data receivers, the MG and the MGC are unable to respond to the request message or complete the setup of the bearer path. Therefore, no support is provided for implementing the session between users in the case that the MG or the MGC needs to serve as data receivers.

SUMMARY OF THE INVENTION

An embodiment of the present disclosure provides a method for implementing a bearer path so as to set up a bearer path in the case that an MG and an MGC serve as data receivers. The method includes: reporting, by an MG, a preset Path Request (PR) event to an MGC according to a received request message related to a bearer path, requesting the MGC to deliver a resource reservation decision; receiving, by the MG, the resource reservation decision sent by the MGC; and processing, by the MG, the bearer path according to the resource reservation decision.

An embodiment of the present disclosure provides another method for implementing a bearer path so as to tear down a bearer path in the case that an MG and an MGC serve as data receivers. The method includes: receiving by an MG, indication information sent by an MGC; and initiating, by the MG, an RSVP ResvTear request according to the indication information, requesting for teardown of the bearer path.

An embodiment of the present disclosure provides an MG. The MG includes: a message receiving module, configured to receive a request message related to a bearer path; an event reporting module, configured to report an event to an MGC according to the request message received by the message receiving module; an indication receiving module, configured to receive indication information sent by the MGC according to the event and/or a resource policy; and a processing module, configured to perform processing according to the indication information received by the indication receiving module.

An embodiment of the present disclosure provides an MGC. The MGC includes: an event receiving module, configured to receive an event reported by an MG according to a request message related to a bearer path; and an indication sending module, configured to send indication information to the MG according to the reported event and/or a resource policy, where the indication information instructs the MG to initiate processing of the bearer path.

In the embodiments of the present disclosure, on the one hand, the MG reports the corresponding event to the MGC according to the received request message related to the bearer path, and therefore, the MGC can decide the reservation of the resources for the bearer path according to the reported event and the resource reservation policy, and instruct the MG to send a path request according to the decision result, thus implementing the setup of the bearer path. On the other hand, the MGC instructs the MG to initiate a process of tearing down the bearer path according to the resource decision. The embodiments of the present disclosure enable a session in the case that the MG and the MGC serve as data receivers.

DETAILED DESCRIPTION OF THE EMBODIMENTS

The embodiments of the present disclosure are detailed below with reference to accompanying drawings.

The embodiments of the present disclosure respond to and process the path message on the bearer by extending the H.248 protocol and using the MG and the MGC as data receivers, thus providing a simple and efficient solution to setup and teardown of a bearer path and error reporting.

Embodiment 1

This embodiment deals with a process of responding to a path setup request message on a bearer and setting up a bearer path with guaranteed resources by using the MG and the MGC as data receivers based on the extended H.248 protocol in a scenario where the resource reservation protocol is the RSVP.

Figure 1:
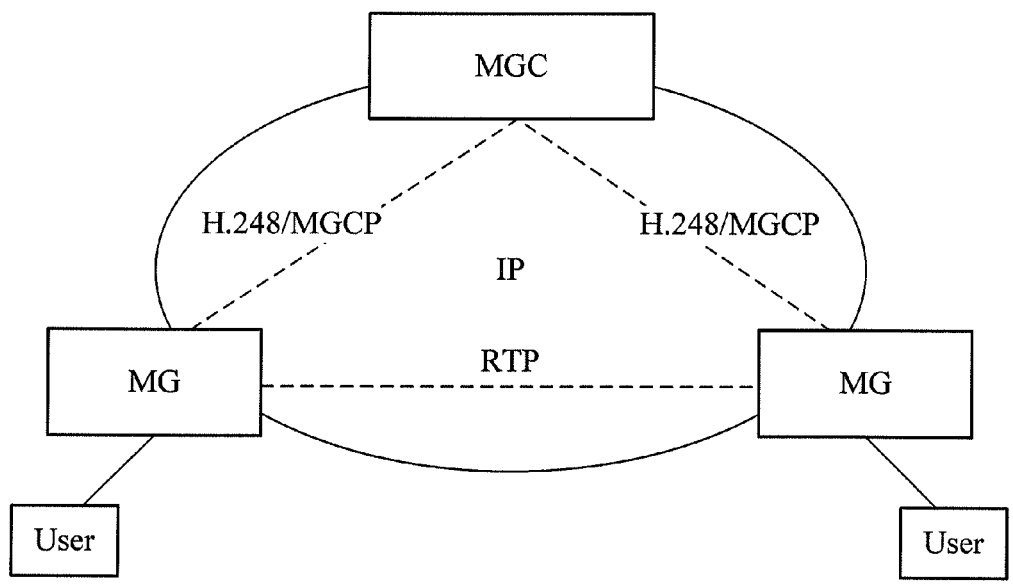
FIG. 1 shows networking of an MGC and two MGs in an NGN in the prior art.
Figure 2:
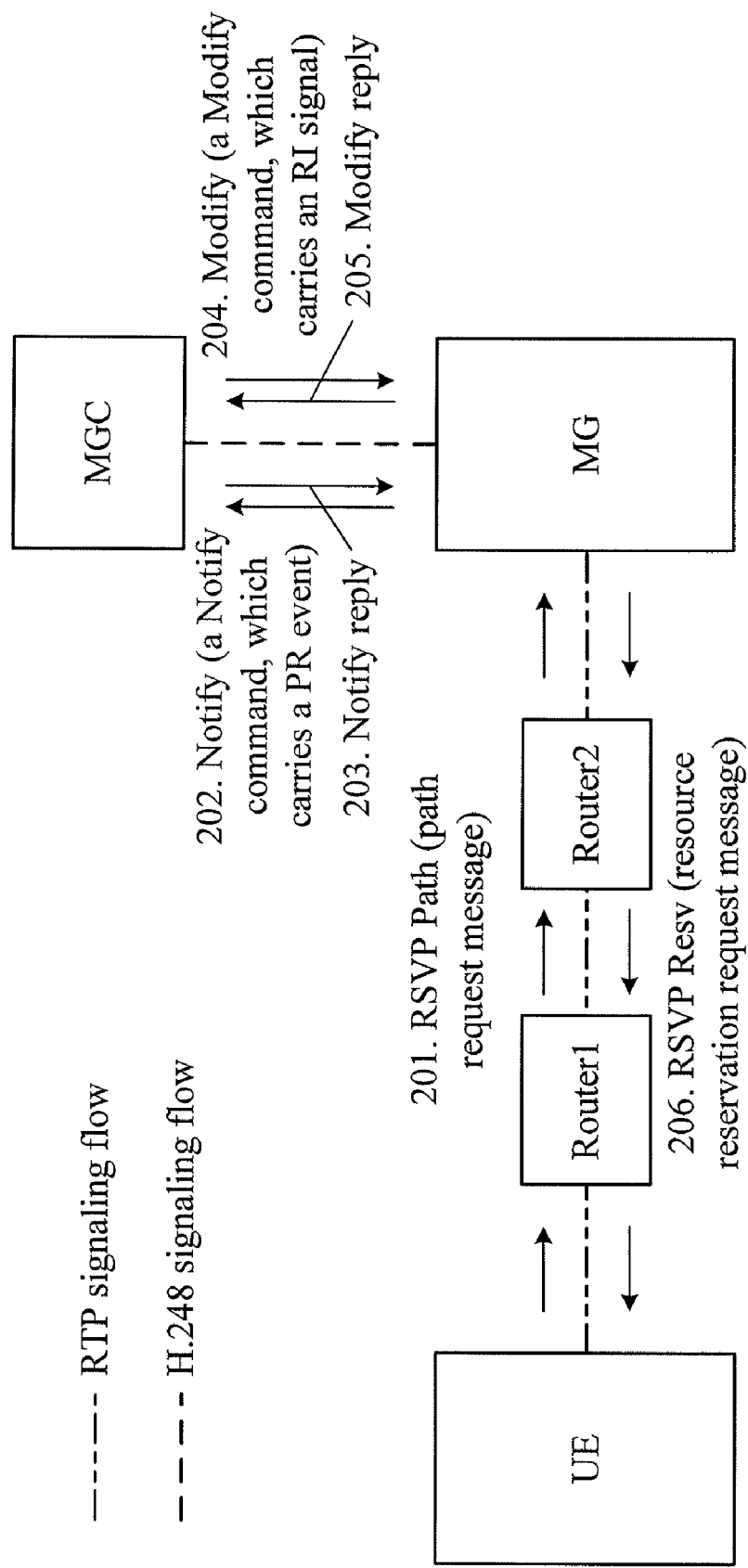
FIG. 2 is a flowchart of a first embodiment of the present disclosure.

FIG. 2 is a flowchart of the first embodiment of the present disclosure. As a data sender, a User Equipment (UE) provides a data stream that has specific QoS requirements. The MG is one of the receivers of the data stream. In this embodiment, the process of setting up a bearer path between the sender and other receivers is omitted, and only a process of setting up a bearer path with guaranteed resources between the sender UE and the receiver MG is described, supposing the receiver is an MG.

The function entities involved in FIG. 2 include: a UE (or another network device), an MG, an MGC, and a router. The specific steps include:

Step 201: The data sender UE sends a path request message (such as an RSVP Path message) to the MG. The path request message may be sent by the UE or another node on the bearer path. In this embodiment, the sender UE sends an RSVP Path message, which is routed by router 1 and router 2 to the MG.

The RSVP Path message carries parameters about the media and the path information for describing the QoS required by the service. According to the RSVP Path message, the receiver MG knows that the sender UE will provide a data stream that requires a specific QoS level. All routers on the bearer path know that proper resources need to be reserved for this data stream.

Step 202: After receiving the RSVP Path message, the MG reports the PR event to the MGC through a Notify command. The reported event may carry the corresponding media and path information parameters.

In this embodiment, an event in the H.248 protocol is extended, for example, named "PR". Through the extended event, the MG reports the received path setup information to the MGC, and requests the MGC to deliver the decision of reserving resources. In the H.248, detection and reporting of an event need presetting or delivery. Therefore, before the MG receives the RSVP Path message on the bearer, a PR event needs to be set on the MG. The event may be delivered by the MGC to the MG, or preset on the MG. For example, the process of delivering the event from the MGC to the MG is: The MGC sets a PR event by sending a Modify request message to the MG. The event may be delivered to the root termination of the MG, or a specific termination on the MG. After receiving the Modify request message, the MG sends a Modify reply message to the MGC. The delivered event carries no parameter.

When the MG needs to request the resource reservation policy from the MGC after receiving an RSVP Path message sent by the UE, the MG reports the event to the MGC by sending a Notify command to the MGC.

The reported PR event may carry some parameters for carrying information about media streams and path resources, and such information serves as a reference for the MGC to make decisions. The parameters carried in the reported PR event may include:

1. Sender Template (ST)

This parameter carries the identifier of the data sender, and corresponds to the SENDER_TEMPLATE object in the RSVP message. The type of this parameter is a string list which includes an IP address and/or a port number. In IPv6, the port number of the sender may be replaced with a flow label.

2. Sender Traffic Specification (STS)

This parameter carries the traffic feature information of the data stream sent by the sender, and corresponds to the SENDER_TSPEC object in the RSVP message. For example, the parameter describes the traffic features through a token bucket. The type of this parameter is a string list which includes at least one of the following string elements:

Token Bucket Rate (TBR);
Token Bucket Size (TBS);
Peak Data Rate (PDR);
Minimum Policed Unit (MPU); and
Maximum Packet Size (MPS): maximum MTU value of the data stream that the sender expects to send.

The MGC may obtain the features of the received data stream according to the foregoing information reported by the MG, and develop the corresponding reservation policies.

3. Default General Parameters Fragment (DGPF)

This parameter carries information about general resources on the bearer path, where the information is collected through the RSVP Path message. The type of this parameter is a string list which includes at least one of the following string elements:

Integrated Services Hop Count (ISHC): number of routers that support integrated services on the bearer path;

Path BandWidth (PBW): minimum available bandwidth in each connection on the bearer path;

Minimum Path Latency (MPL);

Path Maximum Transmission Unit (PMTU): global minimum MTU supported by each connection on the bearer path; and Global Break Bit (GBB): Boolean type, for example, 0 or 1, where 0 means that all nodes on the path support RSVP and the integrated service model, and 1 means that at least one node on the path is unable to provide the QoS control service. If the value of this element is 1, it indicates that other element values in the default general parameters are not reliable because at least one node on the bearer path does not process or update other elements in the parameter.

The MGC may know the availability of the resources on the bearer path according to the foregoing information reported by the MG, and develop the corresponding reservation policies. The information about the features of the path itself in this parameter is unrelated to the specific QoS control service (the guaranteed service or controlled-load service). If no service-specific parameter value appears, the parameter value included in this parameter is applicable to all services.

4. Guaranteed Service Fragment (GSF)

This parameter carries information about the guaranteed service supported on the bearer path, where the information is collected through the RSVP Path message. The type of this parameter is a string list which includes at least one of the following string elements:

Guaranteed Service Break Bit (GSBB): Boolean type, for example, 0 or 1, where 0 means that all nodes on the path support this service, and 1 means that at least one node on the path supports RSVP but does not support this service;

Rate-related end-to-end delay (Ctot);
Rate-unrelated end-to-end delay (Dtot);
Rate-related local delay (Csum);
Rate-unrelated local delay (Dsum); and
Guaranteed Service General Parameters (GSGP): This element may include the parameter information (PBW, MPL, and PMTU) in the default general parameters; if this element includes any parameter, this parameter value needs to replace the value of the corresponding parameter in the default general parameters at the time of selecting a guaranteed service for reservation.

The MGC may know the availability of the resources that support the guaranteed service on the bearer path according to the foregoing information reported by the MG, and develop the corresponding reservation policies. If the reported event does not include such parameter information, the data stream receiver (MG) is unable to initiate a guaranteed service.

5. Controlled-Load Service Fragment (CLSF)

This parameter carries information about resources that support the controlled-load service on the bearer path, where the information is collected through the RSVP Path message. The type of this parameter is a string list which includes at least one of the following string elements:

Controlled-Load Service Break Bit (CLSBB): Boolean type, for example, 0 or 1, where 0 means that all nodes on the path support this service, and 1 means that at least one node on the path supports RSVP but does not support this service;

Controlled-load Service General Parameters (CSGP): This element may include the parameter information (PBW, MPL, and PMTU) in the default general parameters; if this element includes any parameter, this parameter value needs to replace the value of the corresponding parameter in the default general parameters at the time of selecting a controlled-load service for reservation.

The MGC may know the availability of the resources that support the controlled-load service on the bearer path according to the foregoing information reported by the MG, and develop the corresponding reservation policies. If the reported event does not include such parameter information, the data stream receiver (MG) is unable to initiate a controlled-load service.

The parameters numbered 3-5 above may be combined, and correspond to the ADSPEC object in the RSVP message; and the parameters numbered 1-5 constitute the sender description information, and correspond to the information carried in the sender descriptor in the RSVP message.

6. Session ID (SID)

This parameter carries RSVP session information, and corresponds to the SESSION object in the RSVP message. The type of this parameter is a string list which includes at least one of the following string elements:

IP Destination Address (IDA);

IP Protocol Id (IPI); and

Generalized Destination Port (GDP).

7. Resource Reservation Node (RSVP Hop, Abbreviated as "RH")

This parameter carries the node address information of the RSVP message sent on the bearer path, and corresponds to the RSVP_HOP object in the RSVP message. The type of this parameter is a string list which includes at least one of the following string elements:

IP address of the nearest port for sending the RSVP message (Interface IP, abbreviated as "IIP"); and Logical Interface Handle (LIH): information about the interface that sends the message.

8. Time Value (TV)

This parameter carries the Refresh Period R (RPR) of the RSVP Path message, and corresponds to the TIME_VALUES object in the RSVP Path message.

9. Policy Data (PD)

This parameter carries the relevant policy information of the session, and corresponds to the POLICY_DATA object in the RSVP message.

10. Integrity Information (IINFOR)

This parameter carries the relevant encryption data, and is designed to authenticate the message sender and the RSVP message content, and corresponds to the INTEGRITY object in the RSVP message.

11. Destination Address (DA)

This parameter carries the information about the destination address of the message received by the MG, including the destination address and/or port number of the received message.

12. Source Address (SA)

This parameter carries the information about the source address of the message received by the MG, including the source address and/or port number of the received message.

13. User Data Protocol (UDP) Encapsulation Indication (UDPEI)

This parameter carries information about whether the message received by the MG is encapsulated through UDP and the parameter type may be Boolean.

Step 203: After receiving the Notify command, the MGC sends a Notify reply message to the MG.

Step 204: After receiving the Notify command, the MGC sends a Modify command to the MG, thus delivering a resource reservation decision to the MG. The Modify command may carry a Reservation Indication (RI) signal for instructing the MG to send a resource reservation request (RSVP Resv).

According to the PR event (including the carried parameters) reported by the MG, the MGC may know the features of the received data stream and the resource conditions of the bearer path. The MGC makes the resource reservation decision according to the relevant policy, and delivers the decision to the MG through a command sent subsequently. For example, if accepting the path request of the MG, the MGC delivers the relevant resource reservation decision to the MG, and adds an RI signal to the Modify command, which instructs the MG to send an RSVP Resv message to the data sender.

In this embodiment, a signal in the command parameter in the H.248 protocol is extended; for example, the signal is named "RI". Through the extended signal, the MGC instructs the MG to send an RSVP Resv message to the data sender (such as the UE or another node on the bearer path), so as to set up a bearer path with guaranteed resources.

The RI signal delivered by the MGC to the MG may further carry the information about the relevant media streams and path resources obtained after the MGC decides the resource reservation policy. According to such information, the MG sends a RSVP Resv message to set up the bearer path with guaranteed resources. The parameters carried in the sent RI signal may include:

1. Reservation Style (RS)

This parameter describes the resource reservation style, including Fixed-Filter (FF), Shared-Explicit (SE), and Wildcard-Filter (WF). This parameter corresponds to the STYLE object in the RSVP message. If this parameter is not carried in the RI signal, the MG uses the configured default mode.

2. Flow Descriptor List (FDL)

This parameter carries data stream description information such as filter specifications, stream specifications, and reservation specifications. This parameter corresponds to the flow descriptor list object in the RSVP message. The type of this parameter is a string list which includes one or any combination of the following information elements:

TBR;
TBS;
PDR;
MPU;
MPS;

Reservation Rate (RR): information about the reserved bandwidth;

Slack Term (ST): a value of shortage between the end-to-end delay of the path and the delay expected by the application;

Sender IP Address (SADDR); and

Sender Port (SP);

The first five information elements constitute the stream specification information, and the RR and the ST constitute the reservation specification information. In the case of requesting a guaranteed service, this parameter carries the stream specification information and the reservation specification information; in the case of requesting a controlled-load service, this parameter carries only the stream specification information but does not carry the reservation specification information.

The IP address and the port number of the data sender mentioned above constitute the filter specification information.

The content and the format carried in this parameter vary with the reservation style.

Supposing a guaranteed service is requested, an embodiment of this parameter is provided below.

If the reservation style is "WF", this parameter carries only one stream specification information element and one reservation specification information element but does not carry the filter specification information. The format of the parameter may be set to: fdl="tbr,tbs,pdr,mpu,mps,rr,st".

If the reservation style is "SE", this parameter carries only one stream specification information element and one reservation specification information element, and may include one or more filter specification information elements. The filter specification information elements may be separated from each other by a space. For example, this parameter is set to: fdl="tbr,tbs,pdr,mpu,mps,rr,st,saddr1,sp1, saddr2,sp2, saddr3,sp3,", which includes three filter specification information elements: "tbr,tbs,pdr,mpu,mps,rr,st,saddr1,sp1," "saddr2,sp2," and "saddr3,sp3,".

If the reservation style is "FF", this parameter may carry one or more stream specification information elements, reservation specification information elements, and filter specification information elements. The fixed filter elements are separated from each other by a space. For example, this parameter is set to: fdl="tbr 1,tbs1,pdr1,mpu1,mps1,rr1,st1, saddr1,sp1, saddr2,sp2, tbr3,tbs3,pdr3,mpu3,mps3,rr3,st3, saddr3,sp3,", which includes three fixed filter elements: "tbr 1,tbs1,pdr1,mpu1,mps1,rr1,st1,saddr1,sp1," "saddr2,sp2," and "tbr3,tbs3,pdr3,mpu3,mps3,rr3,st3,saddr3,sp3,". If the second filter element includes only the filter specification information, the stream specification information and the reservation specification information of the second filter element are the same as those of the previous filtering element.

3. Reservation Confirm (RC)

This parameter carries the receiver IP address for receiving a reservation confirmation (RSVP ResvConf) message, and corresponds to the RESV_CONFIRM object in the RSVP message. This parameter carried in the signal indicates that the receiver expects to obtain a confirmation upon completion of the resource reservation.

4. SID

This parameter carries RSVP session information, and corresponds to the SESSION object in the RSVP message. The type of this parameter is a string list which includes at least one of the following string elements:

IDA;
IPI; and
GDP.

5. RSVP Hop (RH);

This parameter carries the node address information of the RSVP Resv message sent on the bearer path, and corresponds to the RSVP_HOP object in the RSVP message. The type of this parameter is a string list. The elements carried in the string list are the same as the elements carried in the RH parameter in the RSVP Path message received by the MG.

6. Time Value (TV)

This parameter carries the RPR of the RSVP message, and corresponds to the TIME_VALUES object in the RSVP message.

7. Policy Data (PD)

This parameter carries the relevant policy information of the session, and corresponds to the POLICY_DATA object in the RSVP message.

8. Integrity Information (IINFOR)

This parameter carries the relevant encryption data, and is designed to authenticate the message sender and the RSVP message content, and corresponds to the INTEGRITY object in the RSVP message.

9. Sender Hosts Scope (SHS)

This parameter carries a specific scope of the data sender hosts to which the RSVP message is sent. This parameter corresponds to the SCOPE object in the RSVP message.

10. Destination Address (DA)

This parameter carries the information about the destination address of the message sent by the MG, including the destination address and/or port number of the sent message.

11. Source Address (SA)

This parameter carries the information about the source address of the message sent by the MG, including the source address and/or port number of the sent message.

12. UDP Encapsulation Indication (UDPEI)

This parameter carries information about whether the message sent by the MG is encapsulated through UDP and the parameter type is Boolean.

Step 205: After receiving the Modify command from the MGC, the MG sends a Modify reply message to the MGC.

Step 206: After receiving the Modify command from the MGC, the MG sends, according to the RI signal (including the carried parameters) delivered by the MGC, an RSVP Resv request in the reverse direction of receiving the RSVP Path message.

Through the RSVP Resv message, the network resources on the bearer path from the sender to the receiver are reserved for the session service data stream hop by hop on the bearer path, and the bearer path with guaranteed resources is set up.

In this embodiment, the MGC delivers the RSVP reservation indication information (such as the RI signal and the carried parameters) to the MG. Alternatively, the relevant reservation policy information is configured on the MG, and the MG sends an RSVP Resv message automatically after receiving the RSVP Path message on the path.

Embodiment 2

On the basis of the first embodiment, this embodiment provides a process of handling a path setup error on a node in the process of setting up a bearer path.

Figure 3:
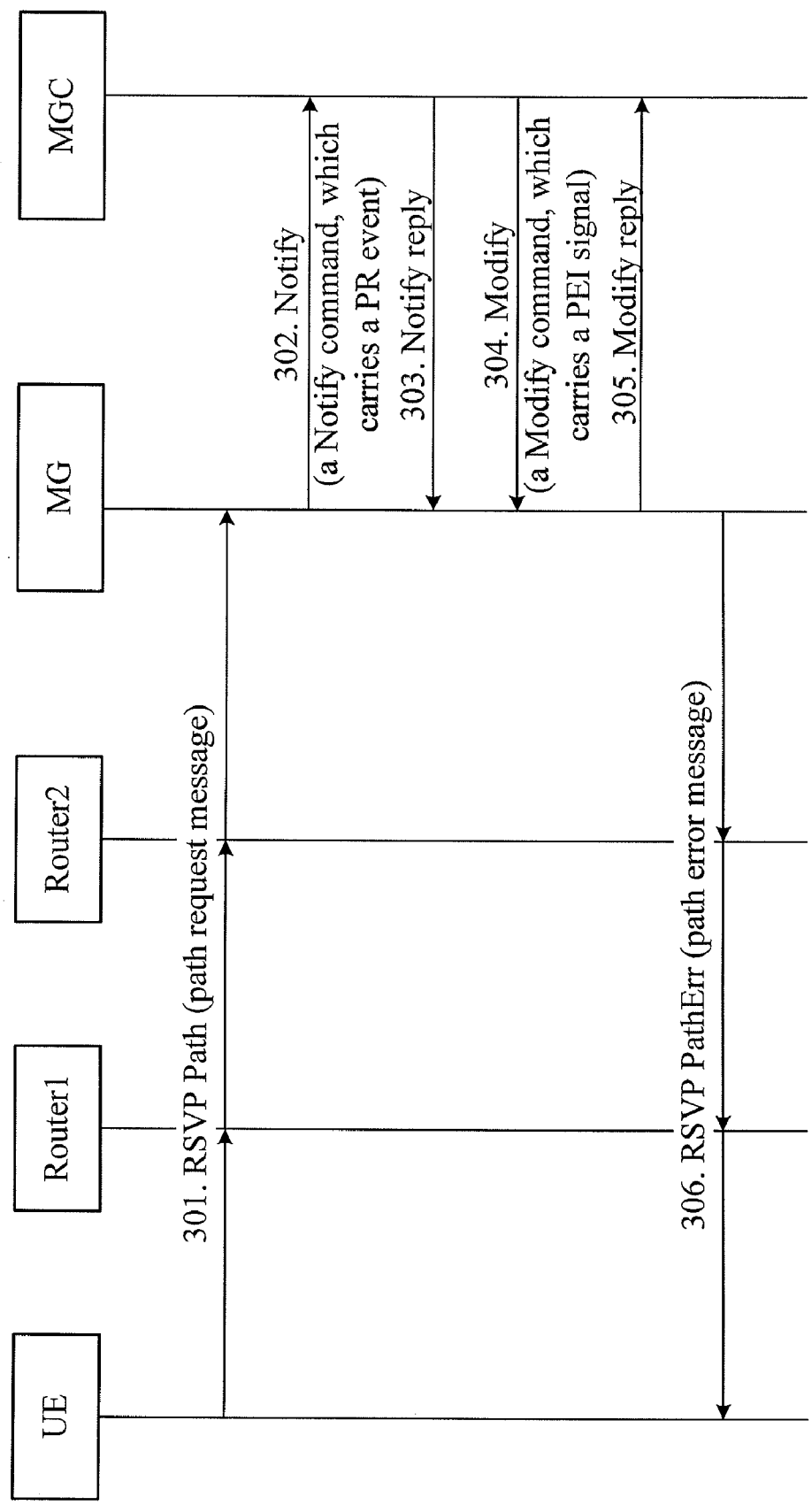
FIG. 3 is a first flowchart of a second embodiment of the present disclosure.

FIG. 3 is the first flowchart of the second embodiment of the present disclosure. Compared with the flowchart in FIG. 2, the flowchart in this embodiment adds a process of handling a resource reservation error on an MGC in the process of setting up a bearer path, and includes the following specific steps:

Steps 301-303: After receiving an RSVP Path message, the MG reports the message to the MGC to request for a resource reservation policy. The steps correspond to steps 201-203 in FIG. 2.

Step 304: In the process of deciding the resource reservation policy, an error occurs on the MGC, and the MGC is unable to provide the corresponding resource reservation policy. Therefore, the MGC delivers a Modify command to the MG. The command carries a Path Error Indication (PEI) signal, which instructs the MG to send an RSVP PathErr message to the sender. The RSVP PathErr message notifies the sender of the path error information in the path setup process.

In this embodiment, a signal in the H.248 protocol is extended; for example, the signal is named "PEI". Through the extended signal, the MGC instructs the MG to send an RSVP PathErr message to the data sender (such as the UE or another node on the bearer path), thus notifying the sender of the path error information in the bearer setup process.

The PEI signal sent by the MGC to the MG may carry information about the media stream and the path resources. Therefore, when the MG sends a path error request, the MG can notify the node on the bearer path of the corresponding information, and the node can resend a path request message, or adjust the path setup policy according to the information about the media and the path resources and then resend a path request. The parameters carried in the sent PEI signal may include:

1. Sender Template (ST)
2. Sender Traffic Specification (STS)
3. Default General Parameters Fragment (DGPF)
4. Guaranteed Service Fragment (GSF)
5. Controlled-Load Service Fragment (CLSF)

The parameters numbered 3-5 above may be combined, and correspond to the ADSPEC object in the RSVP message; and the parameters numbered 1-5 constitute the sender description information, and correspond to the information carried in the sender descriptor in the RSVP message.

6. Session ID (SID)
7. Policy Data (PD)
8. Integrity Information (IINFOR)
9. Destination Address (DA)
10. Source Address (SA)
11. UDP Encapsulation Indication (UDPEI)

The definitions of the parameters numbered 1-11 above correspond to the definitions of the relevant parameters in the PR event in the first embodiment.

12. Error Specification (ES)

This parameter carries error information, and corresponds to the ERROR_SPEC object of the RSVP PathErr message. The error information includes error description and information about the address of the node which detects the error (in this embodiment, the address of the MG).

Step 305: After receiving the Modify command, the MG returns a Modify reply message to the MGC.

Step 306: After receiving the Modify command, the MG sends, according to the PEI signal (including the carried parameters), an RSVP PathErr message in the reverse direction of transmitting the RSVP Path message, notifying each node that an error occurs in the process of setting up the bearer path.

After receiving the RSVP PathErr message, the UE or each node may resend a path request, or adjust the path setup policy and then resend the path request, requesting for setup of a bearer path.

Figure 4:
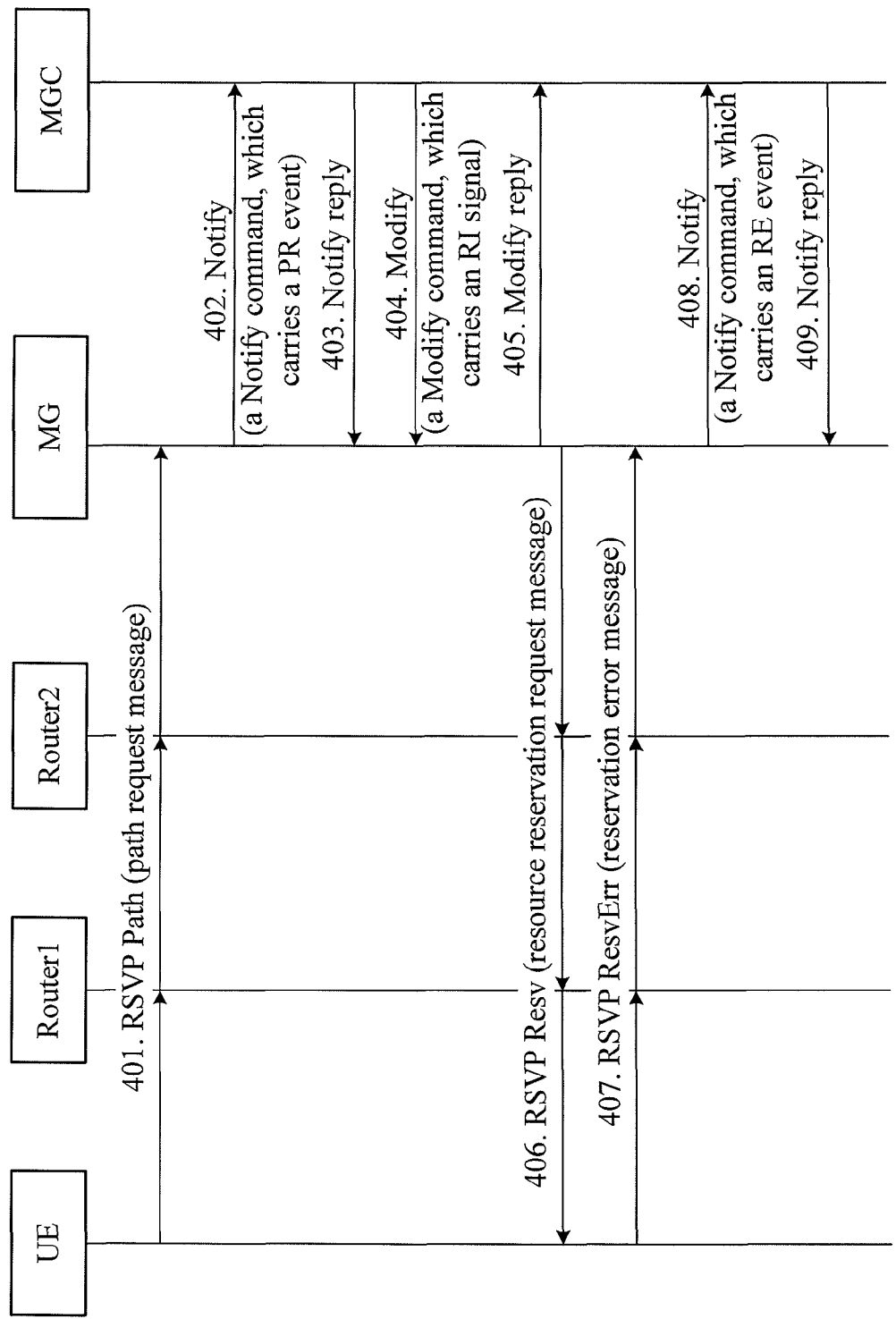
FIG. 4 is a second flowchart of the second embodiment of the present disclosure.

FIG. 4 is the second flowchart of the second embodiment of the present disclosure. Compared with the flowchart in FIG. 2, the flowchart in this embodiment adds a process of handling a resource reservation error on a node on the bearer path from the MG to the UE in the process of setting up the bearer path, and includes the following specific steps:

Steps 401-406: These steps correspond to steps 201-206 in FIG. 2. After receiving an RSVP Path message, the MG reports the message to the MGC, requesting for a resource reservation policy. The MGC delivers a resource reservation policy to the MG, and instructs the MG to send an RSVP Resv request to the sender. Through the RSVP Resv message, the network resources on the bearer path from the sender to the receiver are reserved for the session service data stream on the bearer path hop by hop, and the bearer path with guaranteed resources is set up.

Step 407: In the process of setting up the bearer path, the UE or another network node on the bearer path fails to reserve resources, and sends an RSVP ResvErr message to the MG. The RSVP ResvErr message is generated as a result of the RSVP Resv message, and is sent to the receiver.

There are multiple possible causes for failure of reserving resources, for example: admission failure, bandwidth deficiency, not supporting the service, unqualified stream parameter, or unknown path.

Step 408: After receiving the RSVP ResvErr message, the MG reports a Reservation Error (RE) event through a Notify command to the MGC. Accordingly, the MGC adjusts the relevant resource reservation policy.

In this embodiment, an event in the H.248 protocol is extended; for example, the event is named "RE". Through the event, the MG reports the received reservation error information to the MGC. The event may be delivered by the MGC to the MG, or preset on the MG The delivered event carries no parameter.

After receiving an RSVP ResvErr message sent by the UE or another network node on the bearer path, the MG uses a Notify command to report the RE event to the MGC. The reported event may carry information about media streams and path resources. Therefore, the MGC knows the node where the reservation error occurs and the causes for the error, and decides a resource reservation policy again. The parameters carried in the reported RE event may include:

1. Reservation Style (RS)
2. Flow Descriptor List (FDL)
3. Session ID (SID)
4. RSVP Hop (RH);
5. Policy Data (PD)
6. Integrity Information (IINFOR)
7. Sender Hosts Scope (SHS)
8. Destination Address (DA)
9. Source Address (SA)
10. UDP Encapsulation Indication (UDPEI)

The definitions of the parameters numbered 1-10 above correspond to the definitions of the relevant parameters in the RI signal in the first embodiment.

11. Error Specification (ES)

This parameter carries error information, and corresponds to the ERROR_SPEC object of the RSVP ResvErr message. The error information includes error description and information about the address of the node which detects the error.

Step 409: After receiving the Notify command, the MGC sends a Notify reply message to the MG.

Embodiment 3

On the basis of the first embodiment, this embodiment deals with a process, in which the UE (or another network node on the bearer path) sends an RSVP ResvConf message to the MG, and the MG reports reservation confirmation information to the MGC according to the RSVP ResvConf message after a bearer path is set up.

Figure 5:
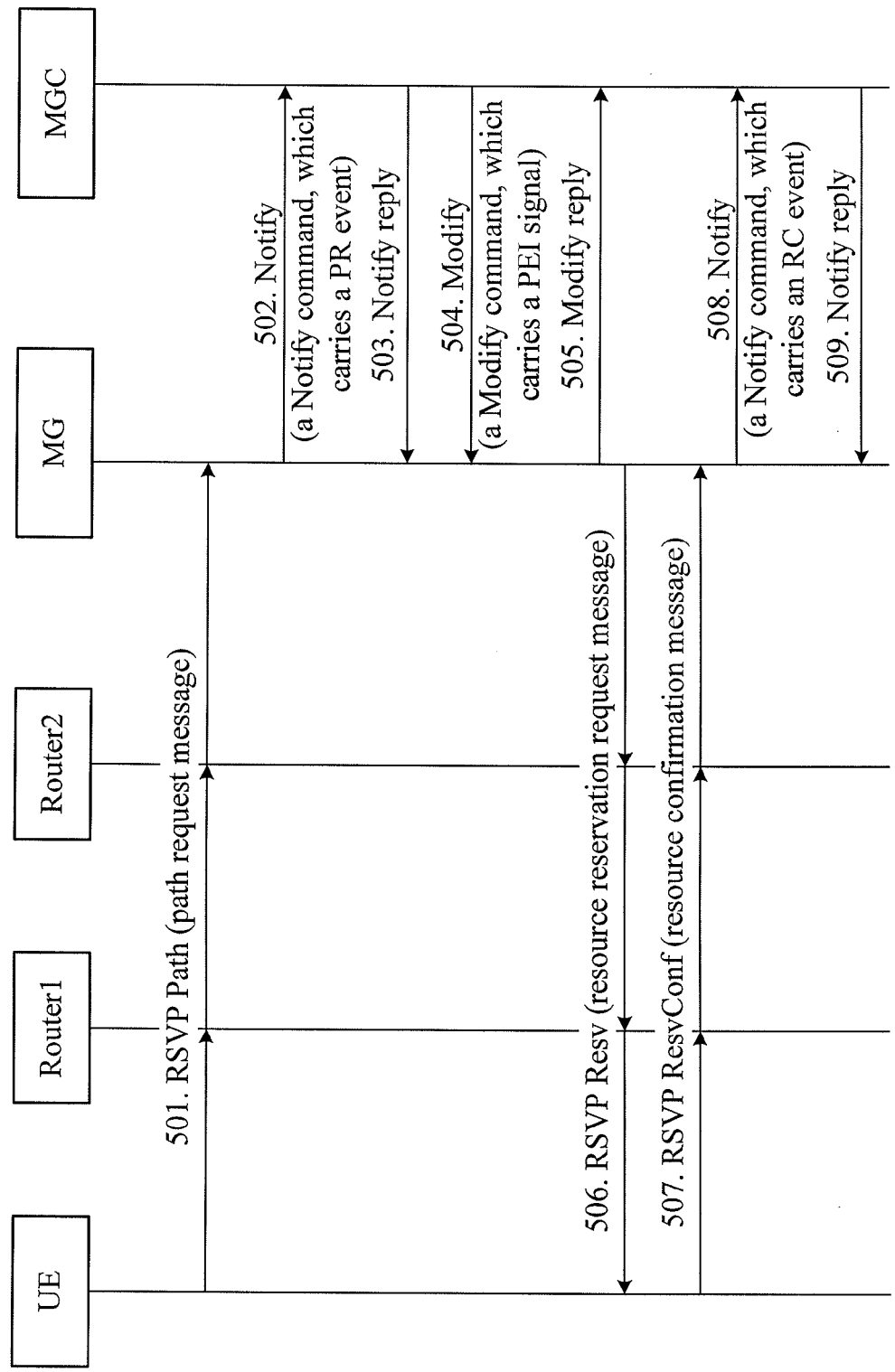
FIG. 5 is a flowchart of a third embodiment of the present disclosure.

FIG. 5 is a flowchart of the third embodiment of the present disclosure. The flowchart in this embodiment adds a reservation confirmation process on the basis of the flowchart in FIG. 2, and includes the following specific steps:

Steps 501-506: These steps correspond to steps 201-206 in FIG. 2. After receiving an RSVP Path message, the MG reports the message to the MGC, requesting for a resource reservation policy. The MGC delivers a resource reservation policy to the MG, and instructs the MG to send an RSVP Resv request to the sender. Through the RSVP Resv message, the network resources on the bearer path from the sender to the receiver are reserved for the session service data stream on the bearer path hop by hop, and the bearer path with guaranteed resources is set up.

Step 507: The UE or another network node on the bearer path sends an RSVP ResvConf message to the MG.

If the RI signal delivered by the MGC to the MG in step 504 carries a Reservation Confirm (RC) parameter, the RSVP Resv message sent by the MG carries an RESV_CONFIRM object, and this object includes a unicast address for receiving the RSVP ResvConf message. If the resource is reserved successfully, the relevant network entity (the data sender or another network node on the bearer path) sends an RSVP ResvConf message to the unicast address. The RSVP ResvConf message is a confirmation of the RSVP Resv message. According to the unicast address obtained from the RESV_CONFIRM object, the RSVP ResvConf message is sent to the receiver host.

Step 508: After receiving the RSVP ResvConf message, the MG reports the Reservation Confirm (RC) event to the MGC through a Notify command.

After receiving the RSVP ResvConf message, if an RC event is set beforehand, the MG reports this event to the MGC.

In this embodiment, an event in the H.248 protocol is extended; for example, the event is named "RC". Through the event, the MG reports the received reservation confirmation information to the MGC. The event may be delivered by the MGC to the Mg, or preset on the MG. The delivered event carries no parameter.

After receiving the RSVP ResvConf message sent by the UE or another network node on the bearer path, the MG uses a Notify command to report an RC event to the MGC. The reported event may carry parameters which facilitate the MGC to confirm information about the resource reservation on the bearer path. Such parameters may include:

1. Reservation Style (RS)
2. Flow Descriptor List (FDL)
3. Session ID (SID)
4. Integrity Information (IINFOR)
5. Reservation Confirm (RC)
6. Destination Address (DA)
7. Source Address (SA)
8. UDP Encapsulation Indication (UDPEI)

The definitions of the parameters numbered 1-10 above correspond to the definitions of the relevant parameters in the RI signal described above.

9. Error Specification (ES)

This parameter carries confirmation indication information, and corresponds to the ERROR_SPEC object of the RSVP ResvErr message. The confirmation indication information includes information about the address of the sender of the RSVP ResvConf message.

Step 509: After receiving the Notify command, the MGC sends a Notify reply message to the MG.

A bearer path may be torn down through an RSVP Tear message. The session-related path and the reservation state can be deleted without waiting for expiry of the timeout period. The RSVP Tear message may be sent by a communication termination system (the sender or the receiver) or sent by an intermediate router after state timeout.

Embodiment 4

This embodiment deals with a process of responding to an RSVP PathTear request message on a bearer and tearing down a bearer path by using the MG and the MGC as data receivers based on an extended H.248 protocol in a scenario where the resource reservation protocol is RSVP.

Figure 6:
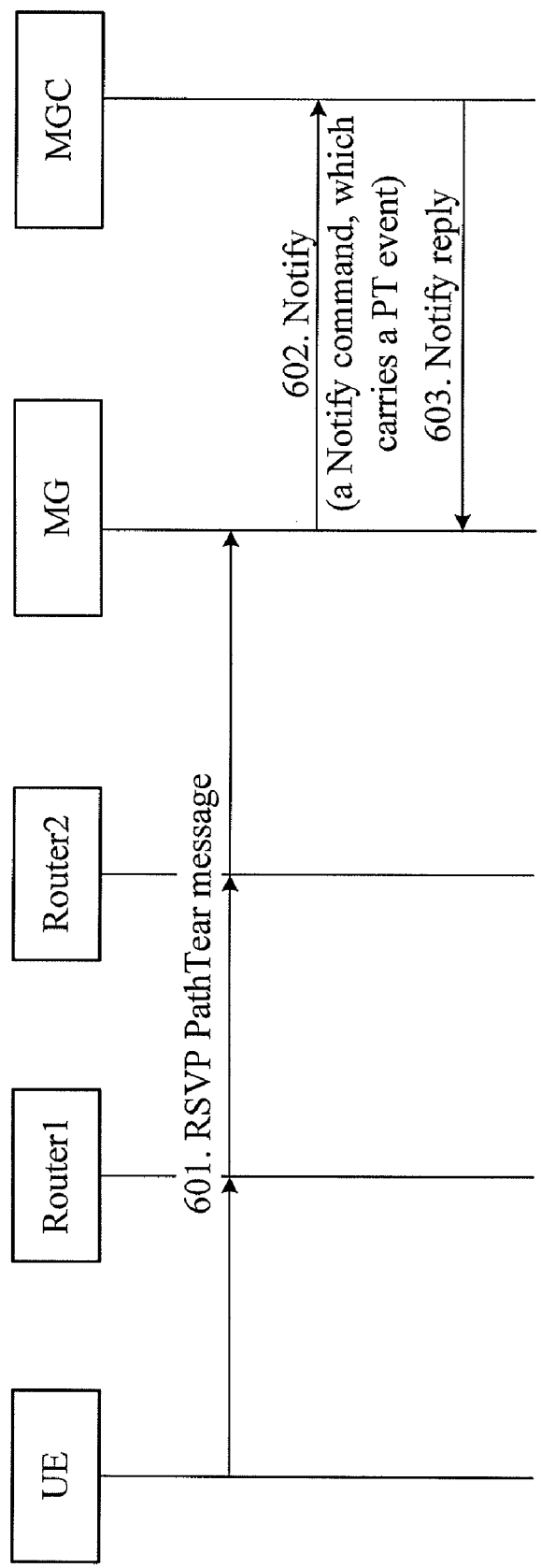
FIG. 6 is a flowchart of a fourth embodiment of the present disclosure.

FIG. 6 is a flowchart of the fourth embodiment of the present disclosure. This embodiment deals with a path teardown process, supposing the sender UE sends an RSVP PathTear message.

The function entities involved in FIG. 6 include: a UE (or another network device), an MG, an MGC, and a router. The specific steps include:

Step 601: The data sender UE (or another node on the bearer path) sends an RSVP Tear message (such as an RSVP PathTear message) to delete the path state, and transmits the message from the sender to all downstream receivers along the route of the RSVP Path message. In this embodiment, the UE sends an RSVP PathTear message, which is routed through router 1 and router 2 to the MG.

According to the RSVP PathTear message, the network resources (such as reserved guaranteed resources) on the bearer path from the sender to the receiver are released for the session service data stream on the bearer path hop by hop, and the bearer path is torn down.

Step 602: After receiving the RSVP PathTear message, the MG reports a Path Tear (PT) event to the MGC through a Notify command. The reported event may carry the corresponding media and path information parameters.

In this embodiment, an event in the H.248 protocol is extended; for example, the event is named "PT". Through the event, the MG reports the received Path Tear information to the MGC. The event may be delivered by the MGC to the MG, or preset on the MG. For example, the process of delivering the event from the MGC to the MG is: The MGC sets a PT event on the MG by sending a Modify request message to the MG. The event may be delivered to the root termination of the MG, or to a specific termination on the MG. After receiving the Modify request message, the MG sends a Modify reply message to the MGC. The delivered event carries no parameter.

The reported PT event may carry some parameters for carrying information about media streams and path resources on the bearer path that is torn down, so that the MGC knows the information, and such parameters may include:

1. Sender Template (ST)
2. Sender Traffic Specification (STS)
3. Default General Parameters Fragment (DGPF)
4. Guaranteed Service Fragment (GSF)
5. Controlled-Load Service Fragment (CLSF)

The parameters numbered 3-5 above may be combined, and correspond to the ADSPEC object in the RSVP message; and the parameters numbered 1-5 constitute the sender description information, and correspond to the information carried in the sender descriptor in the RSVP message.

6. Session ID (SID)
7. RSVP Flop (RH);

8. Integrity Information (IINFOR)
9. Destination Address (DA)
10. Source Address (SA)
11. UDP Encapsulation Indication (UDPEI)

The definitions of the parameters numbered 1-11 above correspond to the definitions of the relevant parameters in the PR event in the first embodiment.

Step 603: After receiving the Notify command, the MGC sends a Notify reply message to the MG.

Embodiment 5

This embodiment deals with a process of initiating bearer path teardown by using the MG and the MGC as data receivers based on an extended H.248 protocol in a scenario where the resource reservation protocol is RSVP.

Figure 7:
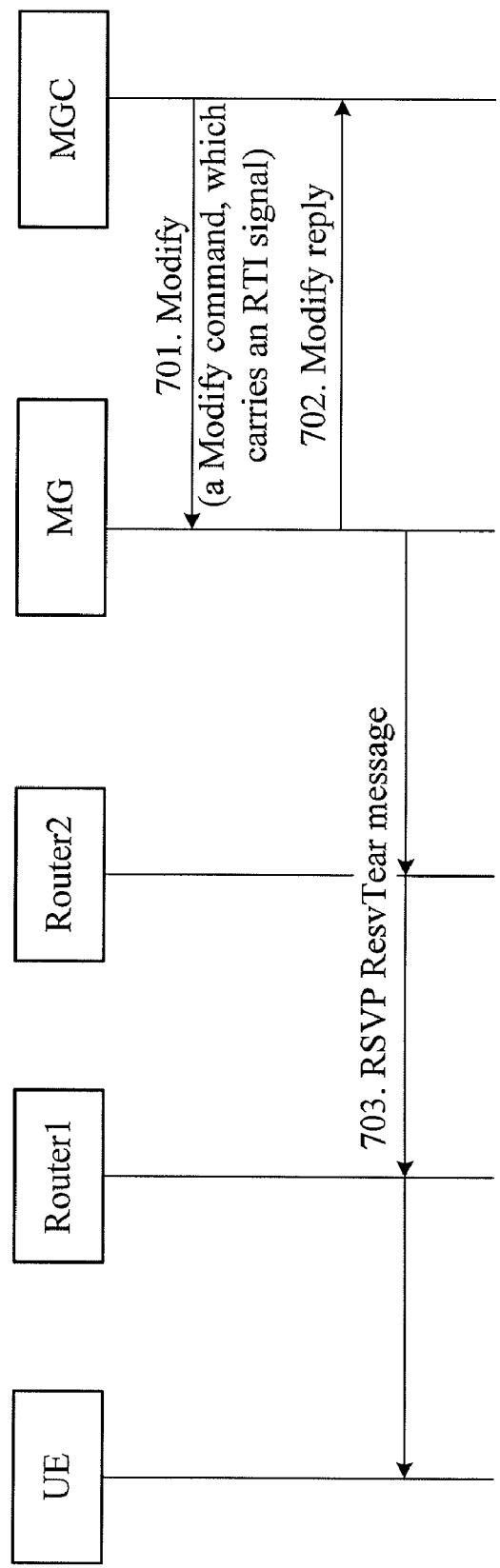
FIG. 7 is a flowchart of a fifth embodiment of the present disclosure.

FIG. 7 is a flowchart of the fifth embodiment of the present disclosure. This embodiment deals with a path teardown process, supposing the MGC and the MG send an RSVP Path-Tear message.

Step 701: According to the relevant resource policy, the MGC decides to tear down the bearer path. Therefore, the MGC sends a Modify command to the MG, instructing the MG to tear down the bearer path. The Modify command carries a Reservation Tear Indication (RTI) signal. The RTI signal instructs the MG to send an RSVP ResvTear message to the data sender (such as the UE or another node on the bearer path), notifying the path node to delete the relevant reservation state.

In this embodiment, a signal in the command parameter in the H.248 protocol is extended; for example, the signal is named "RTI". Through the extended signal, the MGC instructs the MG to send an RSVP ResvTear message to the data sender, notifying the path node to delete the relevant reservation state.

The RTI signal delivered by the MGC to the MG may carry parameters about media streams and the resource path so as to notify the path node to delete the relevant reservation state. Such parameters may include:

1. Reservation Style (RS)
2. Flow Descriptor List (FDL)
3. Session ID (SID)
4. RSVP Hop (RH);
5. Integrity Information (IINFOR)
6. Sender Hosts Scope (SHS)
7. Destination Address (DA)
8. Source Address (SA)
9. UDP Encapsulation Indication (UDPEI)

The definitions of the parameters numbered 1-9 above correspond to the definitions of the relevant parameters in the RI signal in the first embodiment.

Step 702: After receiving the Modify command from the MGC, the MG sends a Modify reply message to the MGC.

Step 703: After receiving the Modify command from the MGC, the MG initiates, according to the RTI signal delivered by the MGC, an RSVP ResvTear request in the reverse direction of receiving the RSVP Path message.

Through the RSVP ResvTear message, the network resources on the bearer path from the sender to the receiver are released for the session service data stream on the bearer path hop by hop, and the bearer path is torn down.

The media and/or path parameters sent together with the signal in the foregoing embodiments may be not only sent as signal parameters, but also sent as signal parameters and/or property parameters. Likewise, the media and/or path parameters sent together with the event in the foregoing embodiments may also be sent as event parameters and/or property parameters. The parameter type of the signals and events defined in the foregoing embodiments is defined as string list parameters, and the contents of such signals and events generally include multiple information elements. The relevant information elements may be combined again, or may be set as separate parameters. All such parameters do not necessarily exist in the relevant signal or event. The type of parameters included in the signal or the event depends on the actual needs. The signal or event may include more parameter information.

The extended definition in the foregoing embodiments takes the RSVP as an example. For other signaling protocols for setting up a bearer path with guaranteed resources, the method described above is also applicable.

A system for implementing a bearer path is provided in an embodiment of the present disclosure.

Figure 8:
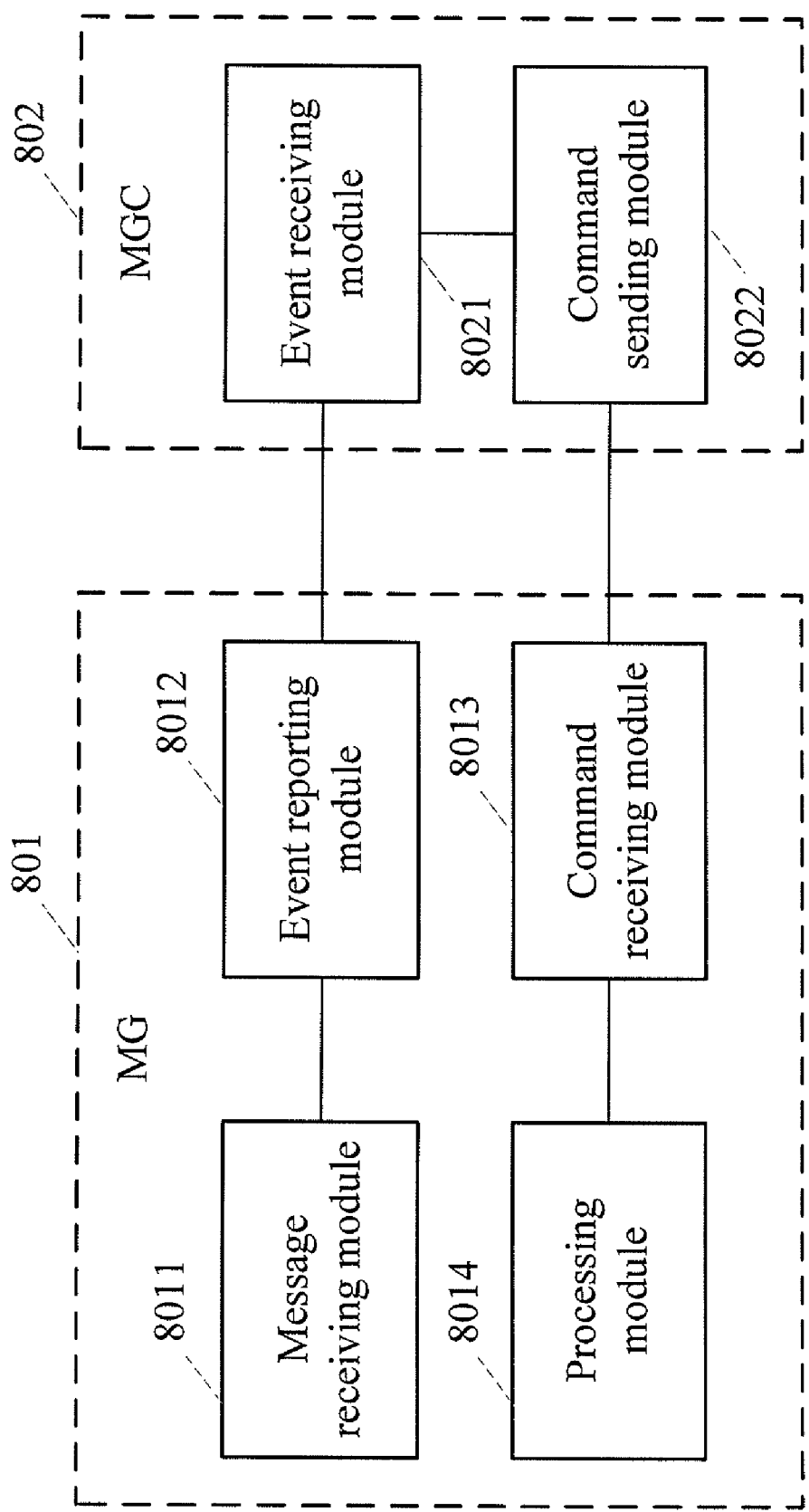
FIG. 8 shows a structure of a system for implementing a bearer path according to an embodiment of the present disclosure.

FIG. 8 shows a structure of a system for implementing a bearer path in an embodiment of the present disclosure. The system includes: an MG 801 and an MGC 802.

The MG 801 is configured to: receive a bearer path message sent by a data sender (such as a UE or another node on a bearer path), and report the event corresponding to the bearer path message to the MGC 802. The MG 801 comprises:

a message receiving module 8011, configured to receive a bearer path message sent by a network node on a bearer path;

an event reporting module 8012, configured to report an event corresponding to the received bearer path message to the MGC 802;

a command receiving module 8013, configured to receive a command sent by the MGC 802 according to the event and/or according to a resource policy, where the command carries an indication signal; and a processing module 8014, configured to send a corresponding bearer path processing request message to a data sender according to the indication signal in the received command.

The MGC 802 is configured to send a command to the MG 801 according to the event reported by the MG 801 and/or according to the resource policy, where the command carries an indication signal which instructs the MG 801 to initiate processing of the corresponding bearer path. The MGC 802 comprises:

an event receiving module 8021, configured to receive an event reported by the MG 801 according to a bearer path message; and a command sending module 8022, configured to send a command to the MG 801 according to the reported event and/or a resource policy, where the command carries an indication signal which instructs the MG 801 to send a bearer path processing request message to a data sender.

For example, in the process of setting up a bearer path, the message receiving module 8011 of the MG 801 receives a path request message sent by the data sender; the event reporting module 8012 reports a Notify command that carries a PR event; the event receiving module 8021 of the MGC 802 receives the PR event; the command sending module 8022 sends a Modify command according to the PR event, where the Modify command carries an RI signal; the command receiving module 8013 of the MG 801 receives the Modify command; and the processing module 8014 sends an RSVP Resv message to the data sender according to the RI signal in the Modify command, so as to set up a bearer path.

In the process of setting up the bearer path, the message receiving module 8011 of the MG 801 may receive the RSVP ResvErr message sent by the data sender, and the event reporting module 8012 reports an RE event; the event receiving module 8021 of the MG 802 receives the RE event, and may decide the resource reservation policy again according to the parameters carried in the event; and the command sending module 8022 sends a Modify command that carries an RI signal.

In the process of setting up the bearer path, the command sending module 8022 of the MGC 802 may send a Modify command according to the resource policy, where the Modify command carries an error indication signal. The command receiving module 8013 of the MG 801 receives the error indication signal; and the processing module 8014 sends a path error (RSVP PathErr) message to the data receiver according to the error indication signal. According to the RSVP PathErr message, each node of the data sender may resend a path request, or adjust the path setup policy and then resend the path request, requesting for setup of a bearer path.

After the bearer path is set up successfully, the message receiving module 8011 of the MG 801 may receive an RSVP ResvConf message sent by the data sender, and report an RC event through the event reporting module 8012; the event receiving module 8021 of the MGC 802 receives the RC event and knows that the bearer path is set up successfully.

In another exemplary process of tearing down the bearer path, the message receiving module 8011 of the MG 801 receives an RSVP PathTear message sent by the data sender, and the event reporting module 8012 reports the message to the event receiving module 8021 of the MGC 802. Alternatively, the command sending module 8022 of the MGC 802 sends an RTI signal according to the resource policy; the command receiving module 8013 of the MG 801 receives the RTI signal; and the processing module 8014 sends an RSVP ResvTear message to the data sender according to the signal, so as to tear down the bearer path.

Figure 9:
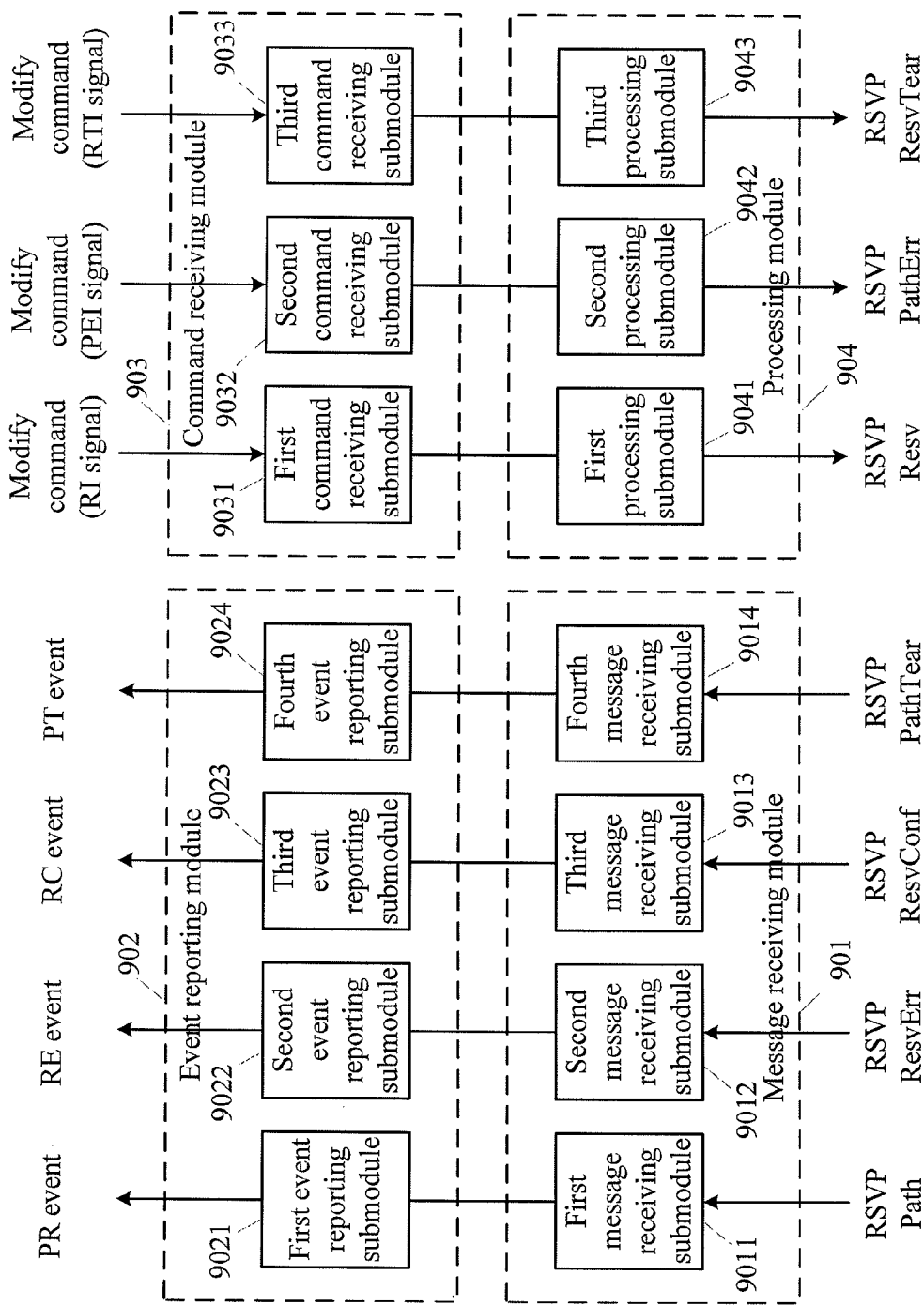
FIG. 9 shows a structure of an MG according to an embodiment of the present disclosure.
Figure 10:
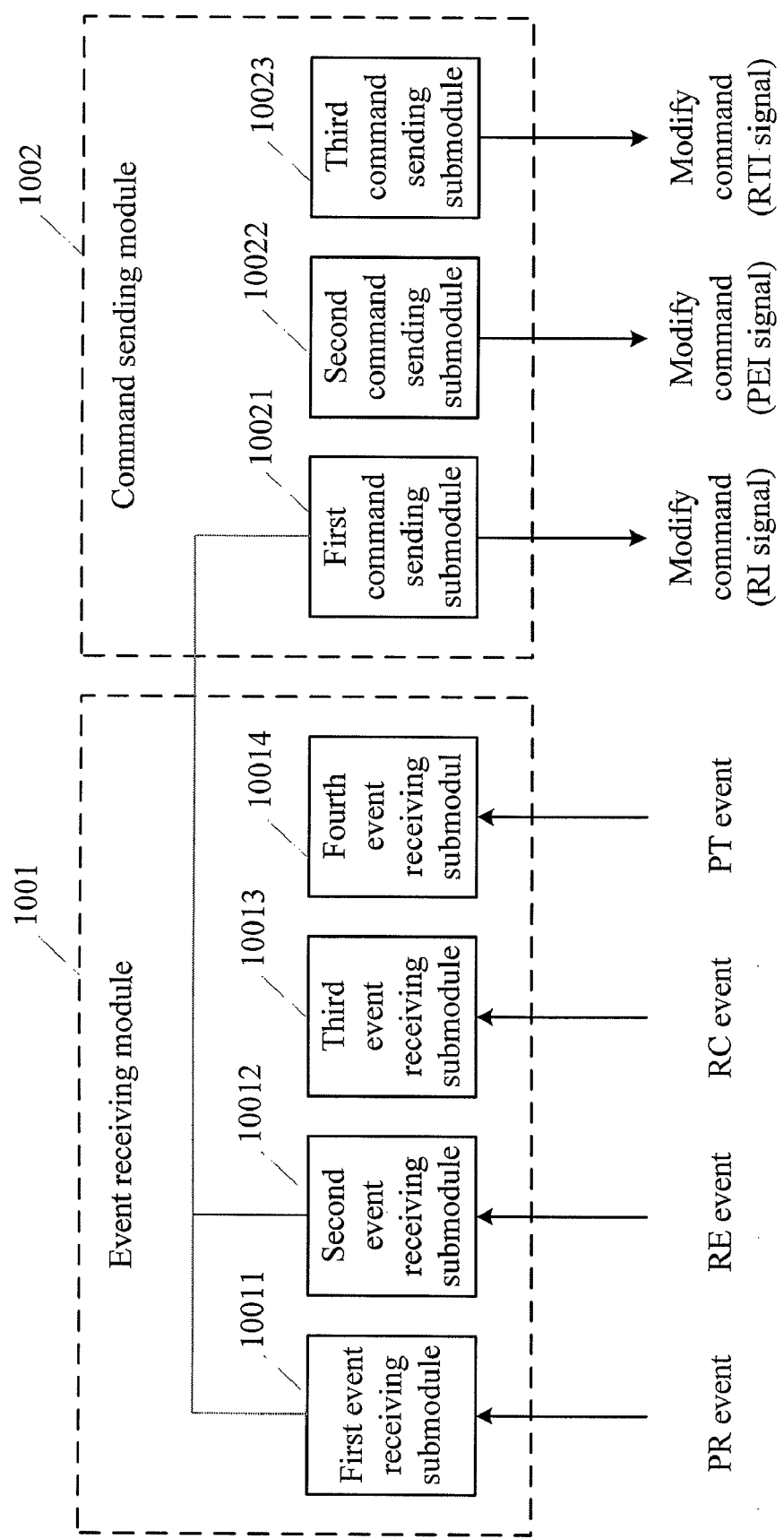
FIG. 10 shows a structure of an MGC according to an embodiment of the present disclosure.

The MG and the MGC in the foregoing system are shown in FIG. 9 and FIG. 10 respectively.

As shown in FIG. 9, an MG provided in an embodiment of the present disclosure comprises:

a message receiving module 901, configured to receive a bearer path message sent by a network node on a bearer path;

an event reporting module 902, configured to report an event corresponding to the received bearer path message to the MGC;

a command receiving module 903, configured to receive a command sent by the MGC according to the event and/or a resource policy, where the command carries an indication signal; and a processing module 904, configured to process the corresponding bearer path according to the indication signal in the received command.

To set up a bearer path, the message receiving module 901 includes a first message receiving submodule 9011, which is configured to receive the path request message sent by the node on the bearer path.

The event reporting module 902 includes a first event reporting submodule 9021, which is configured to report a PR event according to the path request message.

The command receiving module 903 includes a first command receiving submodule 9031, which is configured to receive the command sent by the MGC according to the PR event, where the command carries an RI signal.

The processing module 904 includes a first processing submodule 9041, which is configured to send an RSVP Resv request message to the node on the bearer path according to the RI signal.

To respond to the error information in the process of setting up the bearer path, the message receiving module 901 further includes a second message receiving submodule 9012, and the event reporting module 902 further includes a second event reporting submodule 9022; and/or the command receiving module 903 further includes a second command receiving submodule 9032, and the processing module 904 further includes a second processing submodule 9042.

The second message receiving submodule 9012 is configured to receive an RSVP ResvErr message sent by a node on the bearer path.

The second event reporting submodule 9022 is configured to report an RE event to the MGC according to the RSVP ResvErr message received by the second message receiving submodule 9012.

The second command receiving submodule 9032 is configured to receive a command sent by the MGC according to a PR event and a resource policy after resource reservation decision, where the command carries a PEI signal.

The second processing submodule 9042 is configured to send an RSVP PathErr message to the node on the bearer path according to the PEI signal received by the second command receiving submodule 9032.

To respond to the confirmation information in the process of setting up a bearer path, the message receiving module 901 further includes a third message receiving submodule 9013, which is configured to receive the RSVP ResvConf message sent by the node on the bearer path.

The event reporting module 902 further includes a third event reporting submodule 9023, which is configured to report an RC event to the MGC according to the RSVP ResvConf message.

To respond to the RSVP PathTear message sent by the node on the bearer path, the message receiving module 901 further includes a fourth message receiving submodule 9014, and the event reporting module 902 further includes a fourth event reporting submodule 9024; and/or, to respond to the RSVP PathTear message sent by the data receiver, the command receiving module 903 further includes a third command receiving submodule 9033, and the processing module 904 further includes a third processing submodule 9043.

The fourth message receiving submodule 9014 is configured to receive an RSVP PathTear message sent by a node on the bearer path.

The fourth event reporting submodule 9024 is configured to report a PT event according to the RSVP PathTear message received by the fourth message receiving submodule 9014.

The third command receiving submodule 9033 is configured to receive a command sent by the MGC according to a resource policy, where the command carries an RTI signal.

The third processing submodule 9043 is configured to: send an RSVP ResvTear request message to a node on the bearer path according to the RTI signal received by the third command receiving submodule 9033, and initiate a process of tearing down the bearer path.

As shown in FIG. 10, an MGC provided in an embodiment of the present disclosure comprises:

an event receiving module 1001, configured to receive an event reported by the MG according to a bearer path message; and a command sending module 1002, configured to send a command to the MG according to the event reported by the MG and/or according to a resource policy, where the command carries an indication signal which instructs the MG to initiate processing of the bearer path.

To set up a bearer path, the event receiving module 1001 includes a first event receiving submodule 10011, which is configured to receive a PR event; and the command sending module 1002 includes a first command sending submodule 10021, which is configured to send a command according to the PR event, where the command carries a RI signal which instructs the MG to initiate a RSVP Resv request message to set up a bearer path.

To respond to error information in the process of setting up a bearer path, the event receiving module 1001 further includes a second event receiving submodule 10012, and/or, the command sending module 1002 further includes a second command sending submodule 10022.

The second event receiving submodule 10012 is configured to receive an RE event.

The second command sending submodule 10022 is configured to: make a resource reservation decision according to the PR event and the resource policy, and send a command to the MG, where the command carries a PEI signal.

To respond to confirmation information in the process of setting up a bearer path, the event receiving module 1001 further includes a third event receiving submodule 10013, which is configured to receive an RC event.

To respond to the RSVP PathTear message sent by a node on the bearer path, the event receiving module 1001 further includes a fourth event receiving submodule 10014, and/or, to respond to the RSVP PathTear message sent by the data receiver, the command sending module 1002 further includes a third command sending submodule 10023.

The fourth event receiving submodule 10014 is configured to receive a PT event.

The third command sending submodule 10023 is configured to send a command according to the resource policy, where the command carries a RTI signal which instructs the MG to initiate an RSVP ResvTear request to tear down the bearer path.

In conclusion, by extending the H.248 protocol, the embodiments of the present disclosure respond to and handle the path request message, RSVP PathTear message, RSVP ResvErr message, and RSVP ResvConf message on the bearer efficiently and timely in the case that the MG and the MGC serve as data receivers, thus setting up and tearing down the bearer path with guaranteed resources and handling the errors that occur in the path setup process. Through the process of setting up and tearing down the bearer path described above, it is possible to implement the session in which the MG and the MGC serve as data receivers.

It is apparent that those skilled in the art can make modifications and variations to the present disclosure without departing from the spirit and scope of the present disclosure. The present disclosure is intended to cover the modifications and variations provided that they fall in the scope of protection defined by the following claims or their equivalents.

What is claimed is:

1. A method for implementing a bearer path, comprising:
reporting, by a Media Gateway (MG), a Path Request (PR) event to a Media Gateway Controller (MGC) according to a received path request message related to the bearer path; and
receiving, by the MG, an indication information sent by the MGC according to the PR event, where the indication information is used to instruct the MG to process the bear path;
wherein the PR event carries at least one of media information and path information, and the at least one of media information and path information are described through at least one of the following information elements:
Sender Template (ST), configured to carry identifier information of a data sender;
Sender Traffic Specification (STS), configured to carry traffic feature information of data streams sent by a data sender;
Default General Parameters Fragment (DGPF), configured to carry information about general resources on the bearer path, wherein the information is collected through the path request message;
Guaranteed Service Fragment (GSF), configured to carry information about resources that support a guaranteed service on the bearer path, wherein the information is collected through the path request message;
Controlled-Load Service Fragment (CLSF), configured to carry information about resources that support a controlled-load service on the bearer path, wherein the information is collected through the path request message;
Session ID (SID), configured to carry session information;
RSVP Hop (RH), configured to carry information about an address of a data sender that sends the path request message on the bearer path;
Time Value (TV), configured to carry a period of refreshing the path request message;
Policy Data (PD), configured to carry session policy information;
Integrity Information (IINFOR), configured to carry encryption data for verifying integrity of the path request message;
address information, configured to carry information about a destination address and a source address of the path request message received by the MG; and
User Datagram Protocol (UDP) Encapsulation Indication (UDPEI), configured to indicate whether to encapsulate the path request message received by the MG through UDP.

2. The method of claim 1, wherein:
the indication information comprises a Reservation Indication (RI) signal; and
the processing the bearer path according to the resource reservation decision comprising:
sending, by the MG, a resource reservation (RSVP Resv) request message to a data sender on the bearer path which sends the path request message according to the RI signal, requesting the data sender to set up the bearer path compliant with a resource reservation decision result.

3. The method of claim 2, wherein the RI signal carries at least one of media information and path information, and the MG sends the RSVP Resv request message according to the at least one of media information and path information; and
the at least one of media information and path information are described through at least one of the following information elements:
Reservation Style (RS), configured to carry a resource reservation style;
Flow Descriptor List (FDL), configured to carry description information about a data stream;
Reservation Confirm (RC), configured to carry an IP address for a data receiver to receive a reservation confirmation (RSVP ResvConf) message;
Session ID (ID), configured to carry session information;
RSVP Hop (RH), configured to carry information about an address of a node that sends the RSVP Resv request message on the bearer path;
Time Value (TV), configured to carry a period of refreshing a message;
Policy Data (PD), configured to carry session policy information;

Integrity Information (IINFOR), configured to carry encryption data for verifying integrity of a message;
Sender Hosts Scope (SHS), configured to carry a host scope of a data sender;
address information, configured to carry information about a destination address and a source address of a message sent by the MG; and
User Datagram Protocol (UDP) Encapsulation Indication (UDPEI), configured to indicate whether to encapsulate a message sent by the MG through UDP.

4. The method of claim 2, wherein after the MG sends the RSVP Resv request message, the method further comprises:
receiving, by the MG, an RSVP PathErr message sent on the bearer path, and reporting a Reservation Error (RE) event to the MGC according to the RSVP PathErr message.

5. The method of claim 4, wherein the RE event carries at least one of media information and path information related to resource reservation errors on the bearer path; and the at least one of media information and path information are described through at least one of the following information elements:
Reservation Style (RS), configured to carry a resource reservation style;
Flow Descriptor List (FDL), configured to carry description information about a data stream;
Session ID (ID), configured to carry session information;
RSVP Hop (RH), configured to carry information about an address of a node that sends the RSVP Resv request message on the bearer path;
Policy Data (PD), configured to carry session policy information;
Integrity Information (IINFOR), configured to carry encryption data for verifying integrity of a message;
Sender Hosts Scope (SHS), configured to carry a hosts scope of a data sender;
address information, configured to carry information about a destination address and a source address of a message received by the MG;
User Datagram Protocol (UDP) Encapsulation Indication (UDPEI), configured to indicate whether to encapsulate a message received by the MG through UDP; and
Error Specification (ES), configured to carry error information.

6. The method of claim 2, wherein after the MG sends the RSVP Resv request message, the method further comprises:
receiving, by the MG, a reservation confirmation (RSVP ResvConf) message sent on the bearer path, and reporting a Reservation Confirm (RC) event to the MGC according to the RSVP ResvConf message.

7. The method of claim 6, wherein the RC event carries at least one of media information and path information related to resource reservation confirmation on the bearer path; and the at least one of media information and path information are described through at least one of the following information elements:
Reservation Style (RS), configured to carry a resource reservation style;
Flow Descriptor List (FDL), configured to carry description information about a data stream;
Session ID (ID), configured to carry session information;
Integrity Information (IINFOR), configured to carry encryption data for verifying integrity of the message;
Reservation Confirm (RC), configured to carry an IP address for a data receiver to receive a reservation confirmation (RSVP ResvConf) message;
address information, configured to carry information about a destination address and a source address of the message received by the MG;
User Datagram Protocol (UDP) Encapsulation Indication (UDPEI), configured to indicate whether to encapsulate the message received by the MG through UDP; and
Error Specification (ES), configured to carry confirmation indication information.

8. The method of claim 2, wherein after the bearer path is set up, the method further comprises:
receiving, by the MG, an RSVP PathTear message sent by the node on the bearer path, and reporting a Path Tear (PT) event to the MGC according to the RSVP PathTear message.

9. The method of claim 8, wherein the PT event carries at least one of media information and path information related to the bearer path torn down; and the at least one of media information and path information are described through at least one of the following information elements:
Sender Template (ST), configured to carry identifier information of a data sender;
Sender Traffic Specification (STS), configured to carry traffic feature information of data streams sent by the data sender;
Default General Parameters Fragment (DGPF), configured to carry information about general resources on the bearer path, wherein the information is collected through the RSVP PathTear message;
Guaranteed Service Fragment (GSF), configured to carry information about resources that support a guaranteed service on the bearer path, wherein the information is collected through the RSVP PathTear message;
Controlled-Load Service Fragment (CL SF), configured to carry information about resources that support a controlled-load service on the bearer path, wherein the information is collected through the RSVP PathTear message;
Session ID (ID), configured to carry session information;
RSVP Hop (RH), configured to carry information about an address of a node that sends the RSVP PathTear message on the bearer path;
address information, configured to carry information about a destination address and a source address of the message received by the MG;
User Datagram Protocol (UDP) Encapsulation Indication (UDPEI), configured to indicate whether to encapsulate the message received by the MG through UDP; and
Integrity Information (IINFOR), configured to carry encryption data for verifying integrity of the message.

10. The method of claim 1, wherein:
the indication information comprises a Path Error Indication (PEI) signal; and
the processing the bearer path according to the resource reservation decision comprising:
sending, by the MG, an RSVP PathErr message to a data sender on the bearer path according to the PEI signal.

11. The method of claim 10, wherein the PEI signal carries at least one of media information and path information, and the MG sends the RSVP PathErr message according to the at least one of media information and path information; and the at least one of media information and path information are described through at least one of the following information elements:
Sender Template (ST), configured to carry identifier information of a data sender;

Sender Traffic Specification (STS), configured to carry traffic feature information of data streams sent by a data sender;

Default General Parameters Fragment (DGPF), configured to carry information about general resources on the bearer path, wherein the information is collected through the path request message;

Guaranteed Service Fragment (GSF), configured to carry information about resources that support a guaranteed service on the bearer path, wherein the information is collected through the path request message;

Controlled-Load Service Fragment (CLSF), configured to carry information about resources that support a controlled-load service on the bearer path, wherein the information is collected through the path request message;

Session ID (ID), configured to carry session information;

Policy Data (PD), configured to carry session policy information;

Integrity Information (IINFOR), configured to carry encryption data for verifying integrity of a message;

address information, configured to carry information about a destination address and a source address of a message sent by the MG;

User Datagram Protocol (UDP) Encapsulation Indication (UDPEI), configured to indicate whether to encapsulate the message sent by the MG through UDP; and Error Specification (ES), configured to carry error information.

12. The method of claim 1, wherein:

the indication information comprises a Reservation Tear Indication (RTI) signal; and the processing, by the MG, of the bearer path according to the resource reservation decision comprising:

sending, by the MG, an RSVP ResvTear message to a node on the bearer path according to the RTI signal.

13. The method of claim 12, wherein the RTI signal carries at least one of media information and path information, and the MG sends the RSVP ResvTear message according to the at least one of media information and path information; the at least one of media information and path information are described through at least one of the following information elements:

Reservation Style (RS), configured to carry a resource reservation style;

Flow Descriptor List (FDL), configured to carry description information about a data stream;

Session ID (ID), configured to carry session information;

RSVP Hop (RH), configured to carry information about an address of a node that sends the RSVP ResvTear message on the bearer path;

Integrity Information (IINFOR), configured to carry encryption data for verifying integrity of the message;

address information, configured to carry information about a destination address and a source address of the message sent by the MG;

User Datagram Protocol (UDP) Encapsulation Indication (UDPEI), configured to indicate whether to encapsulate the message sent by the MG through UDP; and Sender Hosts Scope (SHS), configured to carry a hosts scope of a data sender.

14. A Media Gateway (MG), comprising:

a message receiving module, configured to receive a path request message related to a bearer path;

an event reporting module, configured to report a Path Request (PR) event to a Media Gateway Controller (MGC) according to the path request message received by the message receiving module;

a command receiving module, configured to receive indication information sent by the MGC according to at least one of the event and a resource policy; and a processing module, configured to perform processing the bearer path according to the indication information received by the command receiving module;

wherein the PR event carries at least one of media information and path information, and the at least one of media information and path information are described through at least one of the following information elements:

Sender Template (ST), configured to carry identifier information of a data sender;

Sender Traffic Specification (STS), configured to carry traffic feature information of data streams sent by a data sender;

Default General Parameters Fragment (DGPF), configured to carry information about general resources on the bearer path, wherein the information is collected through the path request message;

Guaranteed Service Fragment (GSF), configured to carry information about resources that support a guaranteed service on the bearer path, wherein the information is collected through the path request message;

Controlled-Load Service Fragment (CLSF), configured to carry information about resources that support a controlled-load service on the bearer path, wherein the information is collected through the path request message;

Session ID (SID), configured to carry session information;

RSVP Hop (RH), configured to carry information about an address of a data sender that sends the path request message on the bearer path;

Time Value (TV), configured to carry a period of refreshing the path request message;

Policy Data (PD), configured to carry session policy information;

Integrity Information (IINFOR), configured to carry encryption data for verifying integrity of the path request message;

address information, configured to carry information about a destination address and a source address of the path request message received by the MG; and User Datagram Protocol (UDP) Encapsulation Indication (UDPEI), configured to indicate whether to encapsulate the path request message received by the MG through UDP.

15. The MG of claim 14, wherein:

the command receiving module is specifically configured to receive the indication information sent by the MGC according to the PR event, wherein the indication information is one of a Reservation Indication (RI) signal and a Path Error Indication (PEI) signal;

the processing module is further configured to send a resource reservation (RSVP Resv) request message to a data sender on the bearer path which sends the path request message according to the RI signal received by the command receiving module, or configured to send a path error (RSVP PathErr) message to the data sender on the bearer path according to the PEI signal received by the command receiving module.

16. The MG of claim 15, wherein:

the message receiving module is further configured to receive a reservation error (RSVP ResvErr) message sent by the data sender on the bearer path; or configured to receive a reservation confirmation (RSVP ResvConf) message sent on the bearer path; and the event reporting module is further configured to report a Reservation Error (RE) event to the MGC according to the RSVP ResvErr message; or configured to report a Reservation Confirm (RC) event to the MGC according to the RSVP ResvConf message.

17. The MG of claim 15, wherein:

the message receiving module is further configured to receive an RSVP PathTear message sent by the data sender on the bearer path;

the event reporting module is further configured to report a Path Tear (PT) event according to the RSVP PathTear message;

the command receiving module is further configured to receive the indication information sent by the MGC according to the resource policy, wherein the indication information comprises a Reservation Tear Indication (RTI) signal; and the processing module is further configured to send the RSVP ResvTear message to the data sender on the bearer path according to the RTI signal.

18. A Media Gateway Controller (MGC), comprising:

an event receiving module, configured to receive an event reported by a Media Gateway (MG) according to a request message related to a bearer path; and a command sending module, configured to send indication information to the MG according to at least one of the reported event and a resource policy, wherein the indication information instructs the MG to initiate processing of the bearer path;

wherein the event comprises one of a Path Request (PR) event, a Reservation Error (RE) event, and a Path Tear (PT) event;

wherein the PR event carries at least one of media information and path information, and the at least one of media information and path information are described through at least one of the following information elements:

Sender Template (ST), configured to carry identifier information of a data sender;

Sender Traffic Specification (STS), configured to carry traffic feature information of data streams sent by a data sender;

Default General Parameters Fragment (DGPF), configured to carry information about general resources on the bearer path, wherein the information is collected through the path request message;

Guaranteed Service Fragment (GSF), configured to carry information about resources that support a guaranteed service on the bearer path, wherein the information is collected through the path request message;

Controlled-Load Service Fragment (CLSF), configured to carry information about resources that support a controlled-load service on the bearer path, wherein the information is collected through the path request message;

Session ID (SID), configured to carry session information;

RSVP Hop (RH), configured to carry information about an address of a data sender that sends the path request message on the bearer path;

Time Value (TV), configured to carry a period of refreshing the path request message;

Policy Data (PD), configured to carry session policy information;

Integrity Information (IINFOR), configured to carry encryption data for verifying integrity of the path request message;

address information, configured to carry information about a destination address and a source address of the path request message received by the MG; and User Datagram Protocol (UDP) Encapsulation Indication (UDPEI), configured to indicate whether to encapsulate the path request message received by the MG through UDP.

* * * * *